UNITED STATES PATENT OFFICE.

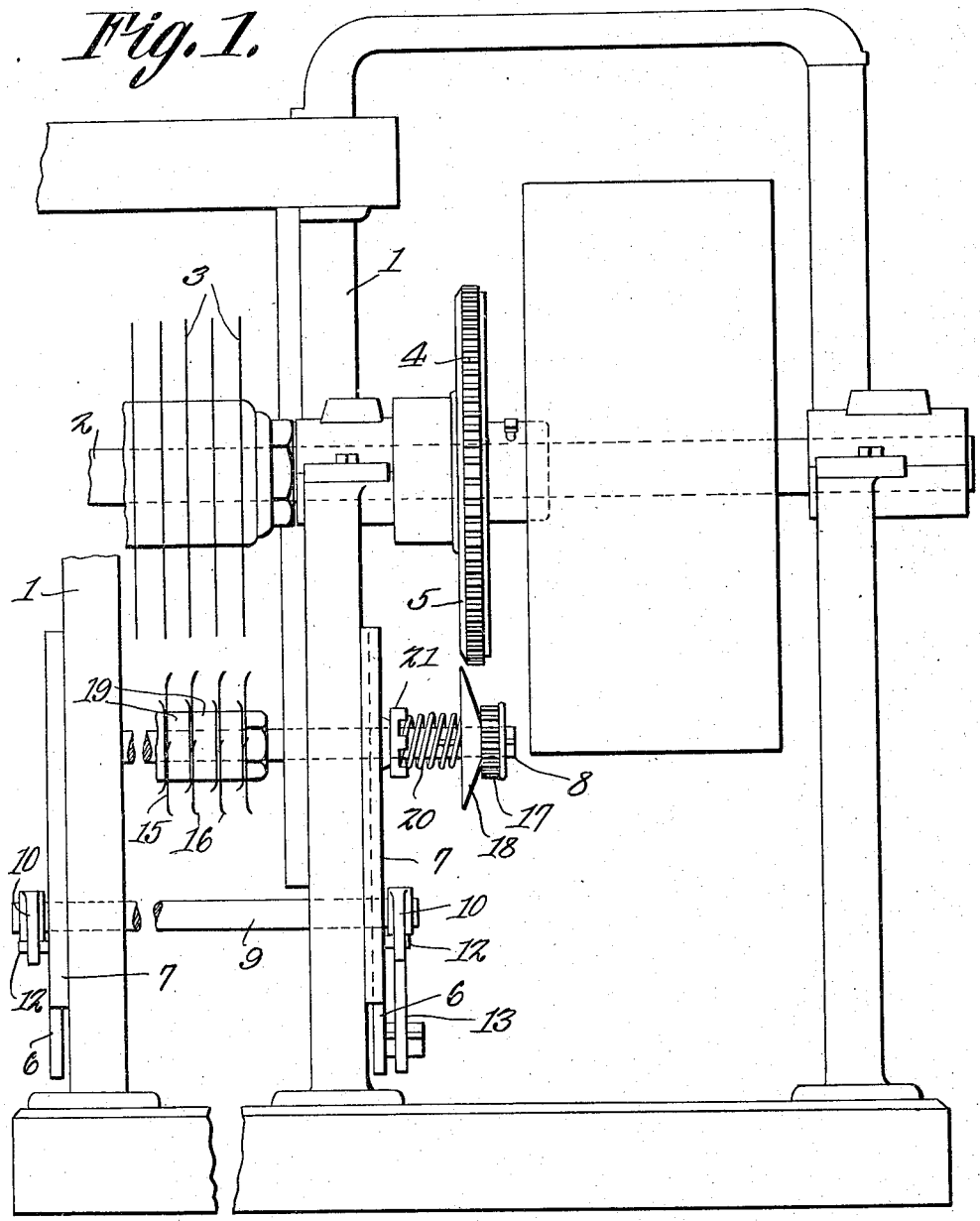

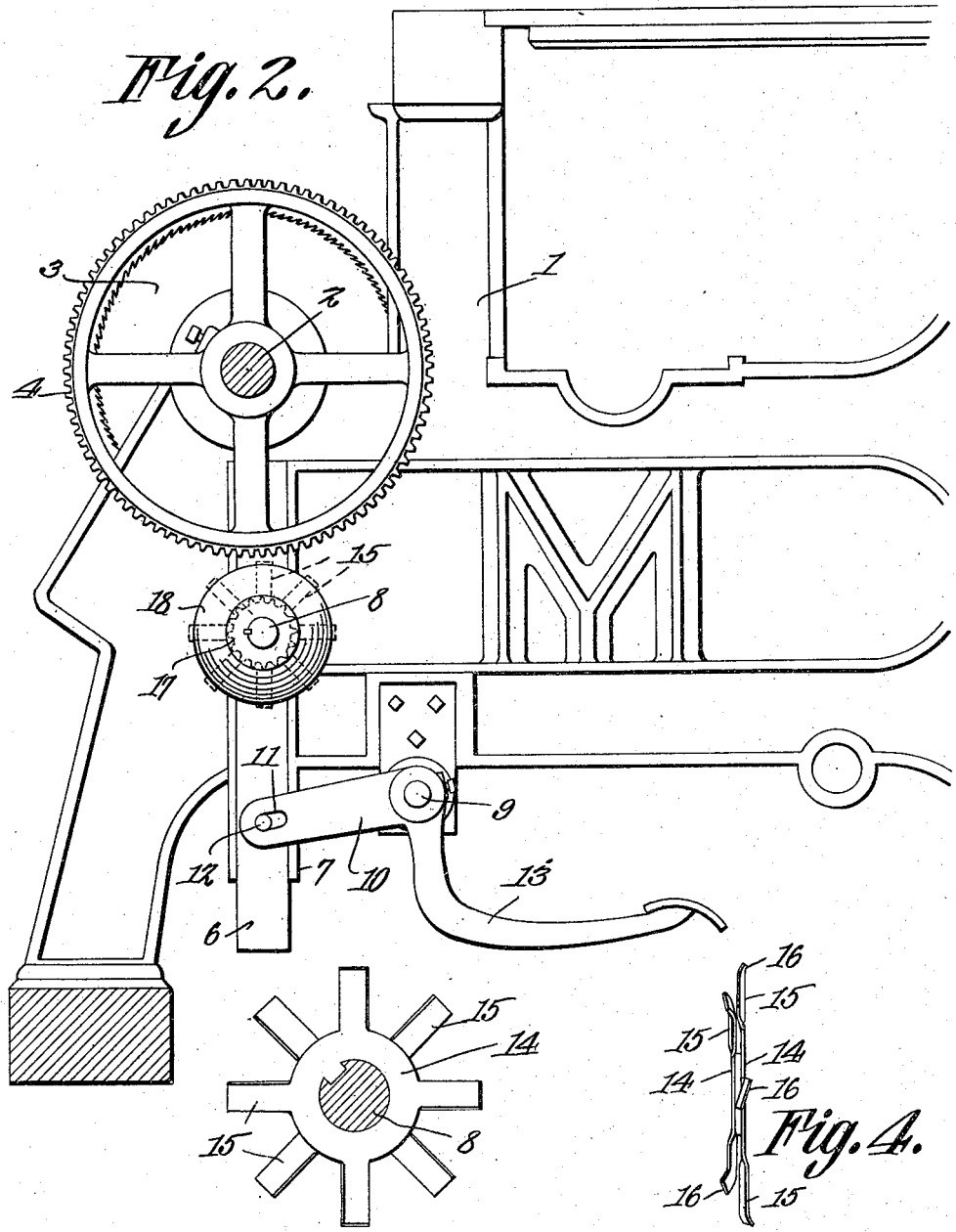

OSBORN BRAGG ROBERTSON, OF GONZALES, TEXAS, ASSIGNOR TO FLOWERS-LYNCH GIN SAW CLEANER CO., OF GONZALES, TEXAS.

GEARING FOR GIN-SAW CLEANERS.

1,215,413.    Specification of Letters Patent.    Patented Feb. 13, 1917.

Application filed June 19, 1916. Serial No. 104,551.

*To all whom it may concern:*

Be it known that I, OSBORN B. ROBERTSON, a citizen of the United States, residing at Gonzales, in the county of Gonzales and State of Texas, have invented a new and useful Gearing for Gin-Saw Cleaners, of which the following is a specification.

The present invention appertains to gin saw cleaners.

It is the object of the invention to provide a cleaning equipment for a gin so constructed and operable that the gin saws can be cleaned easily and effectively from time to time, without stopping the machine or entailing any cumbersome operation or trouble.

The invention includes attrition or cleaning elements coöperable with the gin saws, and novel means for mounting said elements for movement into and out of engagement with the saws, and novel means for operating said elements at a greater relative speed than the saws, whereby to enhance the cleaning action.

It is also the object of the invention to provide an appliance of the nature indicated which is extremely simple, inexpensive and compact in construction, which can be readily installed in various gins, and which will serve its office in a thoroughly practical and efficacious manner.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

The invention is illustrated in the accompanying drawings, wherein:

Figure 1 is a fragmental front view of a gin illustrating the improvements.

Fig. 2 is a side elevation of the parts shown in Fig. 1.

Fig. 3 is an enlarged side elevation of the attrition or cleaning elements.

Fig. 4 is an edge view of a pair of said elements.

Only a portion of a gin is depicted in the drawings, since the present mechanism coöperates with the saws and saw shaft, and no other parts of the gin need be considered.

The gin illustrated embodies the frame 1 in which is journaled the horizontal saw shaft 2 having the circular saws 3 mounted thereon as usual.

In carrying out the invention, a relatively large spur gear 4 is secured in any suitable manner upon the saw shaft 2 to be rotated thereby, and its inner face is provided with a marginal beveled surface 5 at one side of the teeth of the gear. This gear 4 is employed for operating the cleaning mechanism, as will hereinafter more fully appear.

The cleaning device includes a pair of vertically elongated slides 6 mounted for vertical sliding movement in vertical guides 7 carried by the side or end members of the frame 1. A horizontal cleaner shaft 8 is journaled through the slides 6 adjacent their upper ends and below the saws 3, and is raised and lowered to bring the cleaner into and out of operation. In order to move the slides 6 simultaneously, a rock shaft 9 is journaled to the frame 1 in rear of the slides 6 and has arms 10 attached to its ends and provided with slots 11 receiving studs or lugs 12 with which the slides 6 are provided. The shaft 9 can be rocked in any suitable manner, such as by means of a foot lever 13 attached thereto, whereby when the foot lever is depressed, the slides 6 and shaft 8 are raised.

The attrition or cleaning elements are carried by the shaft 8, and embody disks 14 mounted upon the shaft in pairs, and provided with outstanding radial cleaning blades 15. The blades of each pair of disks are preferably in staggered or alternate arrangement, to prevent said blades from becoming clogged, and to also reduce the friction between the cleaner and gin saws. The blades 15 are twisted upon radial lines so that they lie in planes at acute angles with planes at right angles with the axis of the shaft 8, whereby the edges of the blades 15 are presented against the sides of the gin saws when the cleaner is in operation. The free ends 16 of the blades 15 are curved or bent away from the planes of the gin saws, whereby when the cleaner is raised, the gin saws can readily pass between the blades. The disks 14 are properly spaced by spacers 19 upon the shaft 8.

In order to rotate the cleaner at a higher speed than the saws 3, when the cleaner is raised, a small spur gear or pinion 17 is feathered upon the protruding terminal of the shaft 8 and adapted to mesh with the gear 4 when the shaft 8 is raised, and attached to the inner side of the pinion 17 is a conical or beveled friction disk or wheel 18 of fiber or equivalent material. The pinion 17 and disk 18 are normally moved outwardly under the influence of a coiled wire expansion spring 20 disposed upon the shaft 8 between the disk 18 and a seat 21 mounted upon the shaft adjacent the frame 1. Thus, the pinion 17 is normally moved out of the plane of the gear 4 and the disk 18 is moved in the plane of the beveled surface 5 of said gear. The gear 4 and pinion 17 are of proper proportions to assure of the proper speed ratio between the saws 3 and cleaning elements.

Ordinarily, when the lever 13 is released, the cleaner gravitates to inoperative position below the saws. When it is desired to clean the saws, the lever 13 is operated to raise the slides 6 and shaft 8, whereby to bring the cleaning or attrition elements into engagement with the opposite sides of the saws 3. As the shaft 8 is raised, the conical disk 18 first engages or bears against the beveled surface 5, and the frictional engagement of said parts will cause the disk 18 and shaft 8 to be rotated by the gear 4, to start the rotation of the shaft 8, and when the shaft 8 is moved to final raised position, the pinion 17 is brought into mesh with the gear 4, whereby to positively rotate the cleaner. During the upward movement of the shaft 8, the disk 18 in being raised will be slid inwardly, and the beveled surface 5 will gradually move toward the center of the disk 18, thereby accelerating the movement of the shaft 8 until the pinion 17 meshes with the gear 4, the inward movement of the disk 18 while being raised bringing the pinion 17 into the plane of the gear 4. The cleaning elements are rotated at a greater peripheral speed than the saws 3, whereby the adjacent portions of the saws and cleaning elements not only rotate in the same direction, but rotate at different speeds, in order that the cleaning elements will remove any accumulations from the teeth of the saws. By the provision of the disk 18 and beveled surface 5, the rotation of the shaft 8 is started and accelerated as the shaft 8 is raised, and said shaft 8 being spinned will prevent a sudden jar or shock when the pinion 17 meshes with the gear 4. This greatly facilitates the operation of the cleaning device.

It will be obvious to those skilled in the art, that the beveled surface 5 can be provided upon either side of the gear 4, and that the friction disk 18 and spring 20 can be located upon either side of the pinion 17, according to the location of the beveled surface 5, this being a mere reversal of the parts.

Having thus described the invention, what is claimed as new is:

1. In a gearing mechanism, two gears movable transversely of their axes to bring their axes closer together and farther apart to bring them into and out of mesh, one gear being rotated for driving the other, and means for starting the rotation of the driven gear during the time that the two gears are moved toward each other transversely of their axes.

2. In a gearing mechanism, two gears movable toward and away from each other transversely of their axes into and out of mesh, one gear being rotated for driving the other, and means for starting and accelerating the movement of the driven gear as the gears are moved transversely of their axes toward each other.

3. In a gearing mechanism, two gears movable transversely of their axes toward and away from each other into and out of mesh, and a friction disk carried by one gear and engageable with the other during the time that the two gears are moved transversely of their axes toward each other.

4. In a gearing mechanism, gears movable toward and away from each other into and out of mesh and movable relatively into and out of a common plane, one gear having a beveled surface, and a spring pressed conical friction member connected to the other gear and engageable with said beveled surface during the time that the gears are moved toward each other.

5. In a gearing mechanism, a driving gear having a beveled surface at one face, a shaft, said shaft and driving gear being movable toward and away from each other, a gear slidable upon the shaft, a conical friction member secured to the second mentioned gear to contact with said beveled surface when the shaft and first mentioned gear are moved toward each other, and a spring for moving said friction member and second mentioned gear to press the friction member against the beveled surface.

In testimony that I claim the foregoing as my own, I have hereto affixed my signature in the presence of two witnesses.

OSBORN BRAGG ROBERTSON.

Witnesses:
W. J. BRIGHT,
F. M. FLY.